United States Patent [19]

Kobayashi et al.

[11] Patent Number: 4,768,107
[45] Date of Patent: Aug. 30, 1988

[54] HIGH-SPEED CONTACT PRINTING SYSTEM WITH CONTROL SIGNAL WAVEFORM REFINEMENT

[75] Inventors: Toshiharu Kobayashi; Takumi Okaue, both of Tokyo; Toshio Shirai, Kanagawa, all of Japan

[73] Assignee: Sony Corporation, Tokyo, Japan

[21] Appl. No.: 867,925

[22] Filed: May 29, 1986

[30] Foreign Application Priority Data

May 29, 1985 [JP] Japan .................................. 60-116215

[51] Int. Cl.$^4$ ............................................. G11B 5/86
[52] U.S. Cl. ...................................................... 360/17
[58] Field of Search .................................... 360/16, 17

[56] References Cited

U.S. PATENT DOCUMENTS 4,101,938 7/1978 Hanai .................................... 360/16

Primary Examiner—Vincent P. Canney
Attorney, Agent, or Firm—Lewis H. Eslinger; Jay H. Maioli

[57] ABSTRACT

A high-speed contact printing system is provided with a read head which picks up control signals recorded on a slave tape and a recording head which, after a given delay following reproduction of the control signal by the read head, writes the refined control signal back onto the corresponding section of the slave tape. The recording head is so arranged relative to the read head as to face the proper recording track on which the control signal is to be recorded after the given delay. For application to both $\beta$ and VHS systems, the distance H between the read head and the recording head is determined according to the following formula:

$$H = N_\beta \times T_\beta = N_{VHS} \times T_{VHS} \qquad (1)$$

where
$N_\beta$ and $N_{VHS}$ are integers;
$T_\beta$ is the recording pitch (mm) of the control signals in the $\beta$ system; and
$T_{VHS}$ is the recording pitch (mm) of the control signals in the VHS system.

7 Claims, 2 Drawing Sheets

HIGH-SPEED CONTACT PRINTING SYSTEM WITH CONTROL SIGNAL WAVEFORM REFINEMENT

BACKGROUND OF THE INVENTION

The present invention relates generally to a system for transferring contact printing data from a sub-master tape to a blank tape, so-called slave tape or pancake tape. More specifically, the invention relates to a high-speed contact printing system including a feature for refining the waveform of control signals on the slave tape. In particular, the invention relates to a high-speed contact printing designed to duplicate video information in both Beta ($\beta$) and VHS systems.

Contact printing techniques for duplication of video information are well-known. Contact printing can involve copying video information including control (CTL) signals from a pre-recorded sub-master tape to a slave tape at a relatively high speed.

Defects have been encountered in contact printing in that the control signals on the slave tape are susceptible to distortion. This is because the control signals cannot be sufficiently saturated during contact printing and because a signal level loss on the order of 6 dB/oct occurs during printing. This distortion of the control signal can easily cause the video tape recorder system to malfunction.

In order to resolve this defect in conventional contact printing, Japanese Patent First Publication (Tokkai) No. Showa 49-81018 discloses a feature for refining the control signals on the slave tape. The control signals are refined by means of the read head and record head. The read head reproduces the control signals immediately after being copied onto the slave tape. The reproduced control signals are sent to the recording head so that the control signal can be rewritten onto the corresponding section of the slave tape to ensure their saturation.

Therefore, the contact printing system disclosed in the Japanese Patent First Publication No. 49-81018 succeeds in refining the control signals and thereby preventing the video tape recorder systems from malfunctioning.

In addition, as is well known, in the field of video tape recorders, there are two different systems, namely, Beta ($\beta$) systems and VHS systems. The $\beta$ system and VHS system employ different tape speeds and thus different pitches of the control signals on the video tape. For example, in NTSC system standard television monitors, the tape speeds in 2-hour mode, which in $\beta$ systems is the so-called $\beta$II mode running at ½ the standard tape speed, and in standard mode in VHS system, are respectively 20.00 mm/sec. ($\beta$ system) and 33.35 mm/sec. (VHS system). Therefore, tape speed difference in 2-hour mode between $\beta$ and VHS systems is 13.35 mm/sec. per sec. In this case, the pitches of the control signals recorded on the mother tapes are respectively 0.6667 mm ($\beta$ system) and 1.11167 mm (VHS system). The difference between the pitches of the control signals in $\beta$ and VHS systems is thus substantial and cannot be ignored.

This substantial difference between the pitches of the control signals in $\beta$ and VHS systems requires different delay intervals between the read head and the record head. This prevents application of the control signal refining technique of Japanese Patent First Publication No. 49-81018 to both $\beta$ system video information and VHS system video information.

SUMMARY OF THE INVENTION

In view of the above-mentioned defect in the conventional contact printing techniques, it is an object of the present invention is to provide a high speed contact printing system which has a control signal refining means suitable for application to both $\beta$ system video information and VHS system video information.

Another object of the present invention is to provide a method of high-speed contact printing which includes refinement of control signals on a slave tape and which allows contact printing of both $\beta$ system video information and VHS system video information.

In order to accomplish the aforementioned and other objects, a high-speed contact printing system, according to the present invention, is provided with a read head which picks up control signals recorded on a slave tape and a recording head which, after a given delay following reproduction of the control signal by the read head, writes the refined control signal back onto the corresponding section of the slave tape. The recording head is so arranged relative to the read head as to face the proper recording track on which the control signal is to be recorded after the given delay.

For application to both $\beta$ and VHS systems, the distance H between the read head and the recording head is determined according to the following formula:

$$H = N_\beta \times T_\beta = N_{VHS} \times T_{VHS} \qquad (1)$$

where $N_\beta$ and $N_{VHS}$ are integers;

$T_\beta$ is the recording pitch (mm) of the control signals in the $\beta$ system; and $T_{VHS}$ is the recording pitch (mm) of the control signals in the VHS system.

It should be appreciated that the delay between reproduction of the control signal by the read head and re-recording on the corresponding recording track may be determined in relation to the distance between the read head and the recording head.

As will be appreciated, the contact printing system according to the present invention is applicable not only to NTSC systems but also to other systems, such as CCIR systems. In CCIR systems, the tape speed in $\beta$II mode is 18.73 mm/sec and the tape speed in VHS systems is 23.39 mm/sec. Accordingly, the pitches of the control signals in $\beta$ system and VHS system are respectively 0.7492 mm and 0.9356 mm. Even in this case, a contact printing system with read head and recording head separated by a distance with satisfies the foregoing equation can be applied commonly.

Preferably, in NTSC systems, the distance H between the read head and the recording head is selected to be 5 $T_\beta$ to minimize the error between the control signal pitches in the $\beta$ and VHS systems. On the other hand, in the CCIR system, 10 $T_\beta$ is preferable.

A ccording to one aspect of the invention, a high-speed contact printing system for printing video information recorded on a sub-master tape to a slave tape, comprises first means defining a first path along which the sub-master tape runs, second means defining a second path along which the slave tape runs, the second path having a section substantially overlapping a corresponding section of the first path so as to eatablish close contact between the sub-master tape and the slave tape, third means for applying a printing bias to the sub-master tape at the section of close contact between the sub-master tape and the slave tape, fourth means, opposing the second path downstream of the third means, for reproducing a control signal of the video information onto the slave tape, and fifth means, opposing to the second path downstream of the fourth means and synchronously co-operating with the fourth means, for recording a shaped control signal on the slave tape at such a timing that the spacing between control signals recorded on the slave tape by the fifth means substantially corresponds to that reproduced by the fourth means both for $\beta$ system video information an for VHS system information.

The fifth means is separated from the fourth means by a distance which is approximately equal to integral multiples of both the control signal spacing in $\beta$ system and the control signal spacing in VHS system. The distance between the fourth means and fifth means is determined to satisfy the foregoing equation.

Preferably, the distance is selected to be $10 \cdot T_\beta$. In the alternative, the distance between the fourth means and fifth means is selected to be $5 \cdot T_\beta$.

Further preferably, the distance between the fourth means and fifth means is so selected that the spacing between control signals in the $\beta$ system and in the VHS system match under both the NTSC standard and the CCIR standard.

According to another aspect of the invention, a method provided for contact printing video information from a mother tape to a slave tape comprising the steps of:

establishing close contact between the sub-master tape and slave tape;

applying a printing bias to the sub-master tape in close contact with the slave tape;

reading control signals from a control signal track on the slave tape by means of a leading head;

shaping the read control signals and re-recording the control signal track by means of a trailing head at such a timing that the spacing between control signals recorded by the trailing head substantially corresponds to that encountered by the leading head both for $\beta$ system video information and for VHS system video information.

The method further comprises a step of separating the leading and trailing heads by a distance substantially corresponding to integral multiples of the control signal spacings in both the $\beta$ system and the VHS system.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment illustrated but are for explanation and understanding only.

In the drawings.

DESCRIPTION OF THE PREFERRED EMBODIMENT

Figure 1:
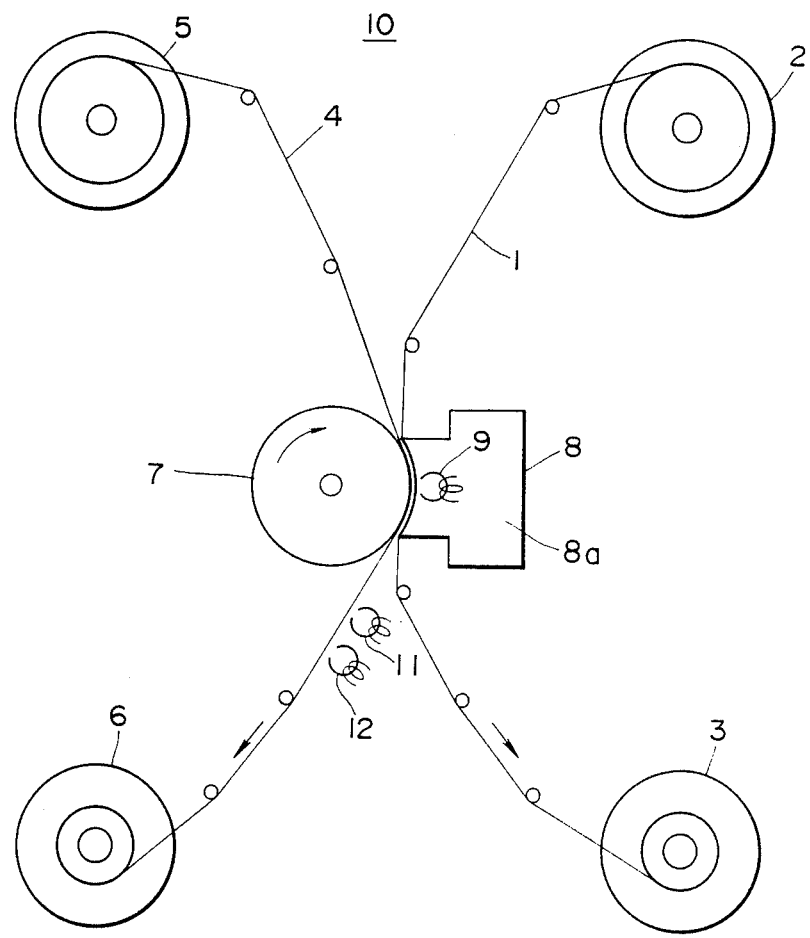
FIG. 1 is a diagram of the overall structure of a high-speed contact printing system, to which the preferred embodiment of control signal refinement is applicable.

Before describing the preferred embodiment of control signal refinement according to the present invention, the general structure of a high-speed contact printing system will be described briefly with reference to FIG. 1. A sub-master tape 1 records video tape recorder (VTR) signal data. In practice, the sub-master tape 1 used in high-speed contact printing is a mirror sub-master tape which is obtained from a master tape by means of a mirror sub-master VTR in a per se well-known process. The sub-master tape 1 is initially wound around a supply reel 2 and feeds onto a winding reel 3 during contact printing. The sub-master tape 1 has a coated surface opposing a blank, slave tape 4. Similar to the sub-master tape 1, the slave tape 4 is initially wound around a supply reel 5 and feeds onto a winding reel 7. The slave tape 4 has a coated surface designed for intimate contact with the coated surface of the sub-master tape 1.

A rotary drum 7 opposes the back surface of the slave tape 4. The rotary drum 7 can move toward and away from the opposing surface of the slave tape 4. A printer head assembly 8 similarly opposes the back surface of the sub-master tape 1. The rotary drum 7 and the printer head assembly 8 oppose each other across the tapes 1, 4.

The printer head assembly 8 defines a pneumatic chamber 8a in which a bias head 9 is housed. The bias head 9 can be a magnetic head for applying a magnetic printing bias or a thermal head for applying a thermal printing bias for printing VTR information from the mother tape 1 onto the slave tape 4.

The rotary drum 7 serves to ensure close contact between the coated surfaces of the sub-master tape 1 and the slave tape 4. Toward this end, the rotary drum 7 is driven toward the printer head assembly 8 to push the slave tape 4 against the sub-master tape 1. To assist in maintaining close contact between the sub-master tape 1 and the slave tape 4, positive air pressure is introduced into the air chamber 8a in the printer head assembly.

By applying printing bias through the printer head 9, the data recorded on the sub-master tape 1, which includes the control signals, is printed on the slave tape.

A read head 11 opposes the slave tape path downstream of the printer head 9. The read head 11 is designed to be in contact with a control signal track on the coated surface of the slave tape 4 in order to reproduce the control signals. A recording head 12 opposes the slave tape path downstream of the read head 11. The recording head 12 writes a saturated form of the control signal onto the control signal track of the slave tape 4 after a given delay following reproduction of the control signal by the read head 11.

Figure 2:
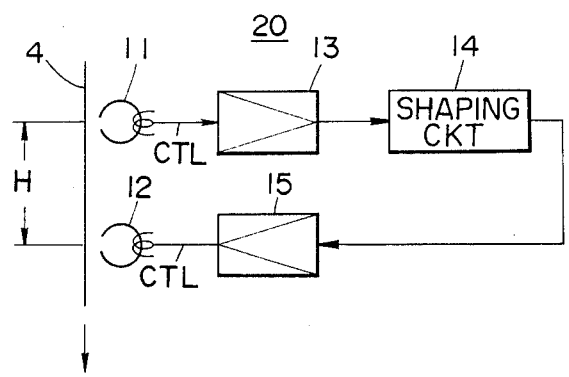
FIG. 2 is a schematic block diagram of the preferred embodiment of a control signal refining circuit employed in the high speed contact printing system of FIG. 1.
Figure 3:
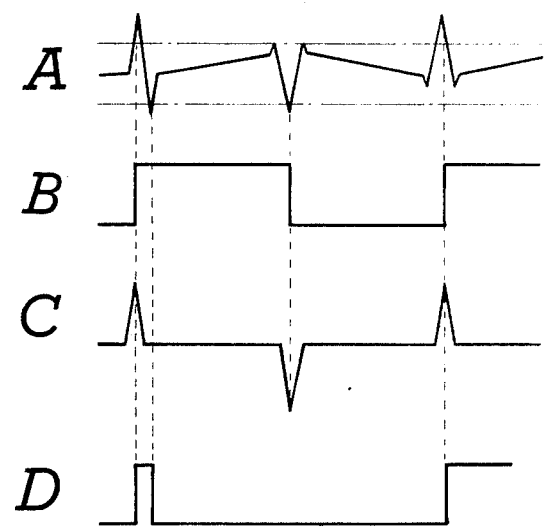
FIG. 3 consisting of A–D shows waveforms of control signals and reproduction output of the control signal.

As shown in FIG. 2, the read head 11 is connected to a reproduction amplifier 13 which reproduces the control signals which have the form illustrated in FIG. 3(A). As can be seen in FIG. 3(A), the reproduced control signals contain noise in the form of spikes. These spikes are due to the fact that the printed control signal cannot be sufficiently saturated or due to printing losses on the order of 6 dB octave otc. The spikes tend to cause errors in the reproduction output, as shown in FIG. 3(D). Errors in the reproduction output of the control signal may cause erroneous control of playback of the printed video information.

In order to avoid this, the reproduced control signal from the reproduction amplifier 13 is sent to a shaping circuit 14. In response to the reproduced control signal from the reproduction amplifier 13, the shaping circuit 14 produces an output in the form illustrated in FIG. 3(B). The output of the shaping circuit goes to a recording amplifier 15 and is then supplied to the recording head 12. As a result, control signals in the form illustrated in FIG. 3(C) are recorded onto the corresponding section in the control signal track on the slave tape 4.

In order to record the refined control signals onto the proper areas of the control signal track, the read head 11 and the recording head 12 are separated by a selected distance H.

As set forth, the pitch of the control signals in 2-hour mode in the NTSC system is 0.6667 mm in the $\beta$ system and 1.11167 mm in the VHS system. The following table shows error (%) of the control signal pitch in the VHS system with respect to that in $\beta$II mode in the $\beta$ system.

TABLE

| HEAD SPACING | NUMBER OF CTL $N_\beta$ | $N_{VHS}$ | CTL PITCH ERROR (%) |
|---|---|---|---|
| $T_\beta$ (0.667) | 1 | 1 | 40.03 |
| $2T_\beta$ | 2 | 1 | −19.94 |
| $3T_\beta$ | 3 | 2 | 20.09 |
| $4T_\beta$ | 4 | 2 | −39.88 |
| $5T_\beta$ (3.333) | 5 | 3 | 0.15 |
| $6T_\beta$ | 6 | 4 | 40.18 |
| $7T_\beta$ | 7 | 4 | −19.79 |
| $8T_\beta$ | 8 | 5 | 20.24 |
| $9T_\beta$ | 9 | 5 | −39.73 |
| $10T_\beta$ (6.667) | 10 | 6 | 0.30 |
| $15T_\beta$ | 15 | 9 | 0.45 |
| $20T_\beta$ | 18 | 12 | 0.60 |
| $25T_\beta$ | 22 | 15 | 0.75 |
| $30T_\beta$ | 27 | 18 | 0.91 |
| $35T_\beta$ | 31 | 21 | 0.06 |

For application to both $\beta$ and VHS systems, the distance H between the read head and the recording head is determined according to the following formula:

$$H = N_\beta \times T_\beta = N_{VHS} \times T_{VHS} \quad (1)$$

where $N_\beta$ and $N_{VHS}$ are integers;

$T_\beta$ is the recording pitch (mm) of the control signals in the $\beta$ system; and $T_{VHS}$ is the recording pitch (mm) of the control signals in the VHS system.

As will be appreciated from the foregoing table and equation (1), if the distance H were selected to be $1 \times T_\beta$, the control pitch error in the VHS system would be greater than 40% due to the initial pitch difference between the $\beta$ system and the VHS system. On the other hand, when the distance H is selected to be $5 \times T_\beta$, the pitch error relative to $3 \times T_{VHS}$ is only 0.15%. Similarly, when the distance H is selected to be $10 \times T_\beta$, the pitch error relative to $6 \times T_{VHS}$ will be 0.30%.

The acceptable control signal pitch error over one field period is generally ±2 msec. This means that the acceptable control signal pitch error per control signal pitch is approximately 12%. Therefore, if the distance H between the read head 11 and the recording head 12 is selected to be $5 \times T_\beta$ (corresponding to $3 \times T_{VHS}$), the control signal pitch error (0.15%) will be significantly smaller than that limit.

On the other hand, when the CCIR standard television system is used, the tape speed in $\beta$II mode in $\beta$ system is 18.73 and in VHS system, 23.39. Therefore, the pitches of the control signals in $\beta$ system and VHS system are respectively 0.7492 mm and 0.9356 mm. Accordingly, the relationship between the distance H between the read head and the recording head and the control signal pitch would be as follows:

When $H = 5 \times T_\beta$, the error will be −44.92% in $\beta$ system and 43.72% in VHS system;

When $H = 10 \times T_\beta$, the error will be 10.16% in $\beta$ system and −12.56% in VHS system; and when H becomes greater than or equal to $15 \times T_\beta$, the error in both system will be greater than 20%.

As will be appreciated herefrom, when the high-speed contact printing system is specifically designed for the NTSC system, the distance H between the read head and the recording head is determined so as to satisfy the foregoing equation (1). As is clear from the foregoing table, the distance H is preferably selected to be $5 \times T_\beta$ in order to minimize pitch error. In this case, the distance H would be approximately 3.333 mm. On the other hand, it is also possible to assign the distance H the value $10 \times T_\beta$. In this case, the distance H would be approximately 6.667 mm.

As set forth above, since the maximum acceptable error of the control signal pitch in VHS system relative to the $\beta$ system at the distance $H = 10 \times T_\beta$ is approximately 12%, in the CCIR system, the head spacing H between the read head and the recording head should be $10 \times T_\beta$ to enable the contact printing system to operate both in the NTSC system and in the CCIR system.

In the case of a CCIR system, it would be possible to further reduce the control signal pitch error by shifting the control signal recording head to a given extent so as to compensate for control signal pitch error when the sub-master tape is prepared.

Therefore, according to the invention, the high-speed contact printing system is applicable not only to $\beta$ systems and VHS systems but also to NTSC systems and CCIR systems. The inventive system will find broad use for duplicating video information in a variety of recording and reproducing systems.

Thus, the present invention fulfills all of the objects and advantages sought therefor.

What is claimed is:

1. A high-speed contact printing system for printing video information including a control signal recorded on a sub-master tape onto a slave tape, comprising:

first means defining a first path along which said sub-master tape runs;

second means defining a second path along which said slave tape runs, said second path having a section substantially overlapping a corresponding section of said first path so as to establish close contact between said sub-master tape and said slave tape and to cause printing of said video information and said control signal onto said slave tape;

third means for applying a printing bias to said sub-master tape at said section of close contact between said sub-master tape and said slave tape;

fourth means, arranged along said second path at a point beyond said third means in a tape travel direction, for reproducing said control signal of the video information printed on said slave tape; and fifth means, arranged along said second path at a point beyond said forth means in the tape travel direction and being separated from said fourth means along said second path by a distance that is an integral multiple of both control signal pulse spacing in a B-system and control signal pulse spacing in a VHS system and receiving said control signal reproduced by said fourth means, for processing said reproduced control signal and recording a shaped control signal on said slave tape such that spacing between pulses of said control signal recorded on said slave tape by said fifth means substantially corresponds to the pulse spacing in respective control signals both for the B-system video information and for the VHS system video information.

2. A high-speed contact printing system as set forth in claim 1, wherein said distance between said fourth means and fifth means is determined to satisfy the following equation:

$$H = N_\beta \cdot T_\beta = N_{VHS} \cdot T_{VHS}$$

where

H is the distance between said fourth and fifth means;

$N_\beta$ and $N_{VHS}$ are integers;

$T_\beta$ is the spacing (mm) between control signals in $\beta$ system; and $T_{VHS}$ is the spacing (mm) between control signals in VHS system.

3. A high-speed contact printing system as set forth in claim 2, wherein said distance is selected to be $10 \cdot T_\beta$.

4. The high-speed contact printing system as set forth in claim 2, wherein said distance between said fourth means and fifth means is selected to be $5 \cdot T_\beta$.

5. A high-speed contact printing system as set forth in claim 2, wherein said distance between said fourth means and fifth means is so selected that the spacing between control signals in the $\beta$ system and in the VHS system match under both the NTSC standard and the CCIR standard.

6. A method for contact printing video information including control signal pulses from a sub-master tape to a slave tape comprising the steps of:

establishing close contact between said sub-master tape and slave tape;

applying a printing bias to said sub-master tape in close contact with said slave tape for causing printing of said video information and control signal pulses onto said slave tape;

reproducing control signal pulses from a control signal track on said slave tape by means of a leading head;

positioning a trailing head beyond the leading head in a direction of tape travel by a distance substantially corresponding to an integral multiple of control signal pulse spacing of a $\beta$-system and control signal pulse spacing of a VHS system;

shaping the reproduced control signal pulses and re-recording the control signal track by the trailing head relative to said leading head in a direction of tape travel so that the spacing between control signal pulses recorded by said trailing head substantially corresponds to control signal pulse spacing for the $\beta$-system video information and for the VHS system video information.

7. A method as set forth in claim 6, wherein said distance between said leading and trailing heads is selected so as to satisfy the following equation:

$$H = N_\beta \cdot T_\beta = N_{VHS} \cdot T_{VHS}$$

where

H is the distance between said fourth and fifth means.

$N_\beta$ and $N_{VHS}$ are integers;

$T_\beta$ is the spacing (mm) between control signals in $\beta$ system; and $T_{VHS}$ is the spacing (mm) between control signals in VHS system.

* * * * *

UNITED STATES PATENT AND TRADEMARK OFFICE
CERTIFICATE OF CORRECTION

PATENT NO. : 4,768,107

DATED : August 30, 1988

INVENTOR(S) : Toshiharu Kobayashi et al.

It is certified that error appears in the above-identified patent and that said Letters Patent is hereby corrected as shown below:

Column 1, line 14, after "printing" insert -- systen --.

Column 3, line 13, change "an" to -- and --.

IN CLAIMS

Column 8, line 35, change "." to --;--.

Signed and Sealed this

Twenty-eighth Day of February, 1989

Attest:

DONALD J. QUIGG

*Attesting Officer*     *Commissioner of Patents and Trademarks*